J. C. NOBLES.
Improvement in Broilers.
No. 120,768.  Patented Nov. 7, 1871.
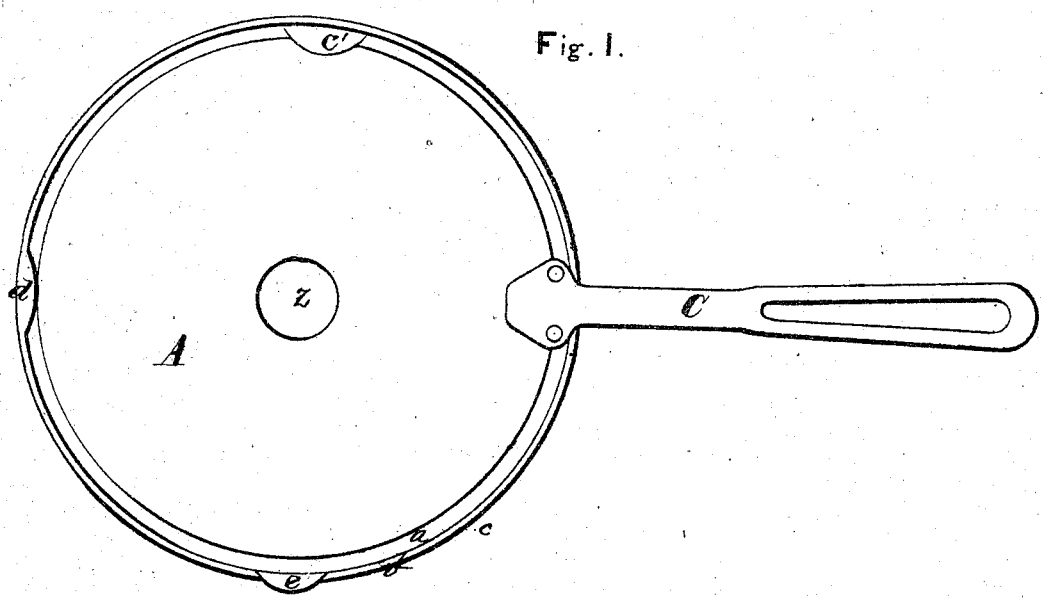
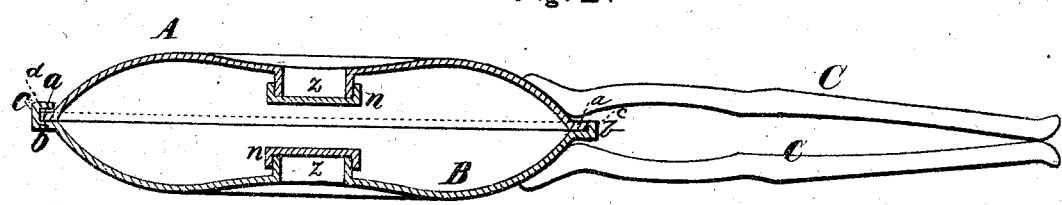
Witnesses.  Inventor.

UNITED STATES PATENT OFFICE.

JOHN C. NOBLES, OF ILION, NEW YORK.

IMPROVEMENT IN BROILERS.

Specification forming part of Letters Patent No. 120,768, dated November 7, 1871.

*To all whom it may concern:*

Be it known that I, JOHN C. NOBLES, of Ilion, in the county of Herkimer and State of New York, have invented a new and valuable Improvement in Broilers; and I do hereby declare that the following is a full, clear, and exact description of the construction and operation of the same, reference being had to the annexed drawing making a part of this specification, and to the letters and figures of reference marked thereon.

Figure 1 of the drawing is a top view of my broiler. Fig. 2 is a central vertical longitudinal section of the same.

This invention has relation to an improvement in culinary utensils; and it consists in forming of sheet metal, and at small expense, an instrument which may be converted at will into a close broiler or close frying-pan, or into two open broilers or friers, whereby I have designed to bring an article of great convenience within the reach of all. This utensil is made in two parts or sections, each of which is designed to serve as a separate instrument, as will be apparent hereafter.

A designates the upper of these sections or pans, and in form it is similar to the lower pan B, with the exception that it has no rim or wall around its circular periphery; but a horizontal ledge, $a$, is formed around its circumference, the object of which will presently appear. The lower pan B is constructed with a slightly-raised center, from which the bottom gradually falls on every side, forming an annular depression or gravy-channel, and then rises on every side to form the wall of the pan. These changes of surface in the bottom are not abrupt, but by gentle curves, as clearly indicated in the sectional view, Fig. 2, of the drawing. Around the perimeter of the pan B a ledge, $b$, is formed, upon which the ledge $a$ of the upper section is designed to fit, a wall or rim, $c$, struck upward from the ledge $b$, serving to keep the sections properly adjusted together. C C represent the handles of the sections. An upward extension or lip, $d$, is formed on that portion of the rim $c$ which is furthest from the handle, which lip is bent over to form a catch, under which the ledge $a$ of the upper pan is placed when the sections are fitted together. As this ledge $a$ extends entirely around the pan it is apparent that the sections may be conveniently fitted together, whatever may be the position of the handles with reference to each other. $e$ represents the pouring-lip, which is formed by depressing the rim $c$ at the proper point over a former, or otherwise bending it into proper shape. A pouring depression is also formed at $c'$ in the other pan. As above described, the pans form when together a close frier, and each section may be separately used as an open frying-pan. The operation of broiling is effected simply by admitting the direct heat from the fire to the viands in the pan. In each section, at the highest portion of its center, is formed a small round opening, $z$, which is sufficient to produce the broiling effect, the direct heat passing through the opening in the lower pan to the meat or other substance which may be in the pan; at the same time the smoke and fumes caused by the direct action of the flames are drawn down by the draught of the stove with the air which passes through the opening in the upper pan. Covers $n$ $n$ are provided for these little openings, and serve to convert the broiler into a frying-pan at short notice whenever it may be desired so to do. For convenience of description I have referred in the above explanation to the upper and lower pans forming this utensil, but either side may be up, as both sections are provided with pouring-places, as above described.

I claim as my invention—

1. The sheet-metal frier and broiler, consisting of two separate pans, A and B, one provided with the bent lip $d$ and rim $c$, the other with the annular ledge $a$, substantially as specified.

2. The sheet-metal frier and broiler, consisting of two separate pans, A and B, one provided with the lip $d$ and rim $c$, the other with the annular ledge $a$, and both with the center-holes $z$ and covers $n$, substantially as specified.

In testimony that I claim the above I have hereunto subscribed my name in the presence of two witnesses.

JOHN C. NOBLES.

Witnesses:
D. D. KANE,
FRANK B. CURTIS.

(154)